O. W. TRUMBULL.
CUTTING MACHINE.
APPLICATION FILED JULY 30, 1910.

999,918.

Patented Aug. 8, 1911

2 SHEETS—SHEET 1.

WITNESSES:
Chas H. Young.
J. B. Smith.

INVENTOR
Oscar W. Trumbull

BY
Parsons, Hall & Bodell
ATTORNEYS

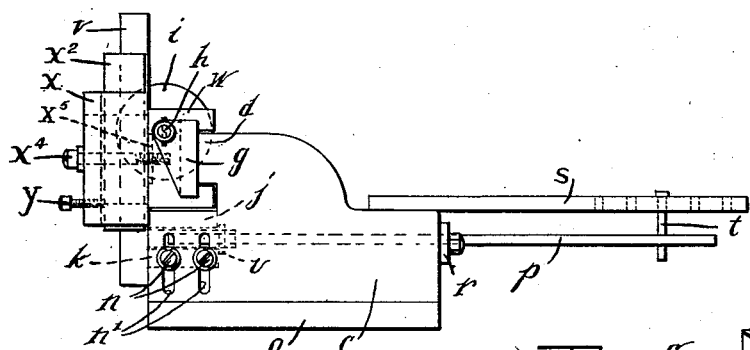

UNITED STATES PATENT OFFICE.

OSCAR W. TRUMBULL, OF PALMYRA, NEW YORK.

CUTTING-MACHINE.

999,918.   Specification of Letters Patent.   Patented Aug. 8, 1911.

Application filed July 30, 1910. Serial No. 574,651.

*To all whom it may concern:*

Be it known that I, OSCAR W. TRUMBULL, of Palmyra, in the county of Wayne and State of New York, have invented a certain new and useful Cutting-Machine, of which the following is a specification.

The object of my invention is to provide a cutting machine which is particularly adapted for slitting, trimming or cutting material having a compressible or yielding character, in the nature of rubber or packing material composed of rubber, or caoutchouc, and a fabric, leather, etc.

In the manufacture of packing rings and the like of rubber or caoutchouc, or the latter substances combined with canvas or similar fabric, the material is turned out in the form of long flat blanks of substantial width, which are placed in a planing or cutting machine and a plurality of comparatively narrow strips cut therefrom. Ordinarily the two outside strips, resulting from this cutting of each blank, are not available for use because of the unevenness of their outside faces or lengthwise edges. The machine devised by me is particularly adapted for trimming these uneven edges and thus rendering the outside strips available for use. In this work the trimmed face of the strip preferably extends in a perpendicular plane, or the face formed by the cutting operation is disposed at right angles to the top and bottom faces of the strip, but the machine is adapted to cut the material in a plane at an angle to said top and bottom faces and thereby provide the trimmed strip with a more or less inclined, or beveled, edge.

The machine is also adapted for slitting or cutting a strip of any cross-sectional shape into two parts with the direction of the cut extending in a vertical plane or at more or less of an angle thereto.

The various novel features which constitute my invention I have particularly pointed out in the claims appended hereto and have described the same in detail in the following specification, which for convenience in understanding is to be taken in connection with the accompanying drawing in which:—

Figure 1:
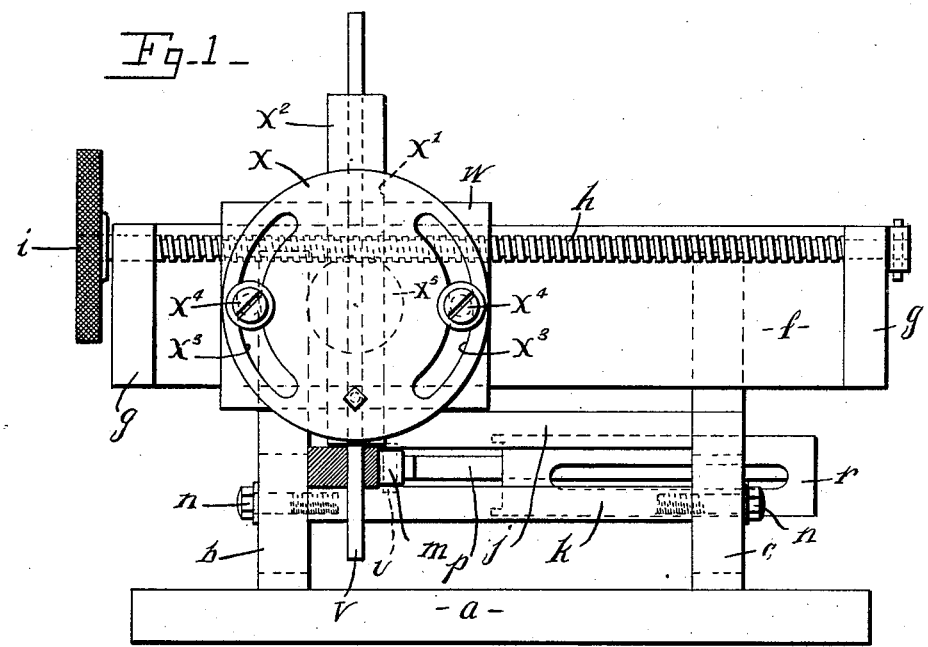
Figure 4:
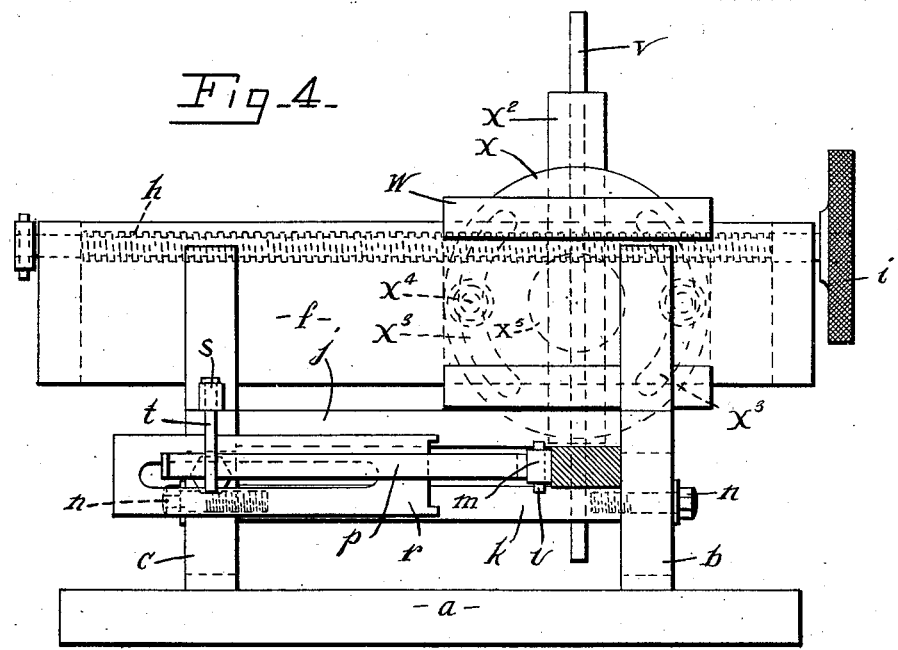

Figure 1, is a front end elevation of the machine. Fig. 2, is a side elevation thereof. Fig. 3, a plan view. Fig. 4, a rear elevation, and Fig. 5, a detail view.

This machine includes, generally, a frame provided with a guide-way or die through which is passed the material to be cut, a knife extending crosswise of the guide-way or die in one direction between the planes of the opposite sides of the guide-way or die, and a carrier for the knife adjustable in a rectilinear direction crosswise of the direction of the knife for moving the knife relatively to the planes of said opposite sides of the guide-way or die, and in a curvilinear direction about an axis extending between such planes and parallel thereto and located outside of the guide-way or die. In the illustrated embodiment of my invention the knife is arranged in close juxtaposition to the exit end of the guide-way or die.

The frame of the machine preferably includes a flat base $a$, parallel sides or standards $b$, $c$, having projections $d$, carrying a cross bar $f$, having marginal portions extending beyond the upper and lower edges of the projections $d$, and provided at its opposite ends with forwardly extending ears or lugs $g$, in which is rotatably mounted a suitable feed screw $h$, provided at one end with a hand wheel $i$. The guide-way or die is preferably formed by the inner face of the side $b$, the lower face of a fixed cross bar $j$, extending between the sides $b$, $c$, the upper face of the bar $k$, adjustably mounted between said sides, and a movable plate or wall $m$, located between the opposing faces of the bars $j$, $k$, and designed to be forced toward the side $b$, by a suitable spring. The bar $k$, is preferably held in position by bolts $n$, movable in vertical slots $n^1$, arranged in the sides $b$, $c$, respectively.

In the illustrated embodiment of my invention the plate or shoe $m$, is forced toward the side $b$, by means of a flat spring $p$, which at its front end engages said plate or shoe, at its rear end is adjustably mounted as will be hereafter described, and at its intermediate portion is engaged by a plate $r$, which is adjustably mounted for the purpose of varying the tension of the spring. As illustrated herein the rear end of the spring $p$, is held by a pin $t$, mounted in one of a plurality of openings in a bar $s$, extending rearwardly from the frame. A plurality of openings are provided so that the pin $t$, may be shifted for varying the point of support for the rear end of the spring $p$. This arrangement with the adjustable plate $r$, provides a desirable means for varying the tension of the spring and adjusting its relation to the shoe or plate $m$. This shoe or plate is provided with lugs $u$, which co-act with the rear edges of the plates $j$, $k$, for preventing the shoe from being drawn out from between these plates as the material under treatment is drawn through the guide-way.

The cutter is designated $v$, and consists of a shank substantially rectangular in cross section, having the lower portion of one of its edges suitably beveled to provide a cutting surface or knife edge. The carrier for this knife preferably comprises a rear head $w$, slidably mounted on the bar $f$, and having a threaded engagement with the screw $h$, and a front head $x$, rotatably mounted on the rear head and provided with a diametrically extending channel $x^1$, opening into the same from its rear face and designed to receive a channel bar $x^2$, which coöperates with the shank of the knife for holding the same in position as will be hereinafter described. In the illustrated embodiment of my invention the head $x$, is in the form of a circular disk provided with an axially disposed rearwardly extending shaft or trunnion $x^5$, which is journaled in a transverse opening of the head $w$. The head $x$, is also provided with two arcuate slots $x^3$, for the reception of the shanks of suitable bolts $x^4$, which are provided for firmly clamping the head in any of its adjusted positions. The shank of the knife $v$, is located in the channel of the plate $x^2$, and as this shank is of greater width than the depth of said channel the rear edge of the shank will be forced against the front face of the head $w$, when pressure is applied to the front face of the channel plate for clamping the latter and the knife in position. As shown in the accompanying drawings such pressure is applied by means of a bolt $y$ threaded in the head $x$, the end of the bolt finding a bearing against the outer face of the channel plate. This arrangement of the knife serves to hold the cutting edge of the same in very close proximity to the exit end of the guide-way or die.

In the operation of the machine for trimming one of the outside faces of a strip of packing material, the bar $k$, and shoe or plate $m$, are first adjusted in relation to the width and thickness of the material to be treated. The strip is then inserted into the rear end of the guide-way and forced through the latter with the trimmed or even edge of the strip in contact with the inner face of the side $b$, and the uneven edge of the strip in contact with the shoe or plate $m$. The front end of this strip, preliminary to the introduction of the same into the guide-way, is slitted for a short distance so that it may pass the knife $v$, and provide a part which may be grasped by the hand or by a suitable apparatus for pulling the remaining portion of the strip through the guide-way and into engagement with the cutter. By means of the screw $h$, the cutter is adjusted in a direction cross-wise of the guide-way to locate it in reference to the width of the material to be trimmed and by means of the rotatable head $x$, the knife is disposed in a vertical plane or at an angle to the same so as to provide the cut or trimmed face of the strip with a perpendicular or more or less beveled surface.

As hereinbefore outlined, the machine may be used for dividing into two parts a strip rectangular in cross-section by cutting the strip along a diagonal line, or line extending substantially from corner to corner of the strip so as to divide a rectangular strip into two strips, each of which will be, in cross-section, substantially the shape of a right angle triangle. This would require the knife being positioned at an angle to the vertical plane, which position is readily attained by properly adjusting the carrier as before described.

For cutting or slitting a piece of material having a cross-sectional shape other than rectangular, a suitable supplemental die is preferably provided having a bore or guide-way of the cross-sectional shape of the strip to be cut and this supplemental die is placed in the described guide-way of the machine and the material to be cut drawn through the same.

When the machine is employed for trimming the edge of the strip of material the knife $v$, is preferably ground as shown in Fig. 5 of the drawings, so that the cutting edge of the blade portion $v^1$, will be in a plane of one face of the shank.

When the machine is used for slitting or splitting a strip of material, I preferably use a cutter in which the blade is provided with oppositely beveled faces, the cutting edge being in a plane intersecting the middle of the edge face of the shank.

What I claim is:—

1. In a machine of the class described and in combination, a frame provided with a guide-way or die, a cutter extending cross-wise of the guide-way or die in one direction, and a carrier for the cutter, the cutter being adjustable in a rectilinear direction at an angle to the direction of the cutter for positioning the cutter relatively to opposite sides of the guide-way, the carrier being also adjustable in a curvilinear direction, substantially as and for the purpose described.

2. In a machine of the class described and in combination, a frame provided with a guide-way or die, a cutter extending cross-wise of the guide-way in one direction, and a carrier for the cutter, the carrier being adjustable in a rectilinear direction at an angle to the direction of the cutter for positioning the cutter relatively to opposite sides of the guide-way or die, the carrier being also adjustable in a curvilinear direction about an axis located outside of, and extending substantially parallel to, the guide-way or die, substantially as and for the purpose specified.

3. In a machine of the class described and in combination, a frame provided with a guide-way or die, a cutter extending crosswise of the guide-way or die in one direction, and a carrier for the cutter adjustable in a rectilinear direction relatively to opposite sides of the guide-way or die in a direction at a right angle to the direction of the cutter, and in a curvilinear direction about an axis located outside of the guide-way or die and extending between the planes of the sides of the guide-way or die, substantially as and for the purpose set forth.

4. In a machine of the class described and in combination, a frame formed with a guide-way or die, a knife extending crosswise of the guide-way or die in one direction, and a carrier for the knife comprising a head adjustable in a direction crosswise of the guide-way in a direction at an angle to the direction of the knife, and a second head movably mounted on the first head, substantially as and for the purpose described.

5. In a machine of the class described and in combination, a frame provided with a guide-way or die, a knife extending crosswise of the guide-way or die in one direction, and a carrier for the knife comprising a head adjustable cross-wise of the guide-way or die in a direction at a right angle to the direction of the knife, and a second head journaled in the first-mentioned head and arranged with its axis located outside of and extending substantially parallel to the guide-way or die, substantially as and for the purpose specified.

6. In a machine of the class described and in combination, a frame provided with a guide-way or die, a knife extending crosswise of the guide-way or die in one direction, a carrier for the knife comprising a head slidably mounted on the frame and movable along the frame crosswise of the guide-way or die in a direction at a right angle to the direction of the knife, and a second head rotatably mounted on the first-mentioned head and arranged with its axis extending substantially parallel to the guide-way or die, means for clamping the rotatable head to the slidable head, and means for shifting the slidable head, substantially as and for the purpose set forth.

7. In a machine of the class described and in combination, a frame provided with a guide-way or die, a knife extending crosswise of the guide-way or die in one direction, a carrier for the knife, said carrier comprising a head slidably mounted on the frame and movable in a direction crosswise of the guide-way or die in a direction at a right angle to the direction of the knife, said head being formed with a bearing located outside of the guide-way or die and extending substantially parallel thereto, and a second head having a trunnion journaled in said bearing, an arcuate slot concentric with the axis of the bearing, and a diametrically extending channel way opening through its rear face and extending in the direction of the knife, a bolt extending through the slot and into the first head, means in the channel way for engaging the shank of the knife, and means for shifting the first-mentioned head, substantially as and for the purpose described.

8. In a machine of the class described and in combination, a frame formed with a guide-way or die having a portion of one of its side walls movable laterally, a spring for resisting such lateral movement, a knife extending crosswise of the guide-way or die and located near the yielding portion of the side wall, and a carrier for the knife, substantially as and for the purpose specified.

9. In a machine of the class described and in combination, a frame formed with a guide-way or die having a portion of one of its side walls movable laterally, a spring for resisting such lateral movement, a knife extending crosswise of the guide-way and located near the yielding portion of said wall, and a carrier for the knife adjustable in a rectilinear direction at a right angle to the direction of the knife and in curvilinear direction about an axis extending parallel to the guide-way or die, substantially as and for the purpose set forth.

10. In a machine of the class described and in combination, a frame provided with a guide-way or die, and including side bars and a cross bar having forwardly extending lugs, a feed screw journaled in the lugs, a knife, and a carrier for the knife including a head slidably mounted on said cross bar and having a threaded engagement with said screw, substantially as and for the purpose set forth.

11. In a machine of the class described and in combination, a frame provided with a guide-way or die and including side bars and a cross bar having forwardly extending lugs, a feed screw journaled in the lugs, a knife, and a carrier for the knife including a head slidably mounted on said cross bar and having a threaded engagement with said screw, and a second head journaled in the first-named head and provided with an opening for the reception of said knife, and with means for clamping the knife in position, substantially as and for the purpose described.

12. In a machine of the class described and in combination, a frame provided with a guide-way or die, a knife having a shank substantially rectangular in cross section, a channel bar having its channel designed to receive said shank, said channel being of less depth than the width of the shank, a carrier comprising a rear head, and a front head mounted on the rear head and having a channel extending diametrically through the same and opening out through the rear face thereof, for the reception of said channel bar, and means for forcing the channel bar rearwardly whereby the shank of the knife is clamped between the face of the first-named head and the bottom of channel in the channel bar, substantially as and for the purpose specified.

13. In a machine of the class described and in combination, a frame provided with a guide-way or die, a knife having a shank substantially rectangular in cross-section, a channel bar having a channel therein for the reception of said shank, said channel being of less depth than the width of the shank, a carrier comprising a rear head and a front head mounted on the rear head and having a channel extending diametrically through the same and opening out through the rear face thereof, for the reception of said channel bar, and means for forcing the channel bar rearwardly, said means including a screw threaded in the front head and at its end engaging the face of the channel bar, substantially as and for the purpose set forth.

14. In a machine of the class described and in combination, a frame comprising a base and side bars or standards, a cross bar secured to the standards and provided at opposite ends with lugs, a feed screw mounted in said lugs, cross bars extending between the said side bars and providing a guide-way between their opposing faces, a plate or shoe located between the last-named bars and having a clamping face opposed to the inner face of one of said side bars, a knife, and a carrier therefor comprising a head slidably mounted on the first-named cross bar, and having an engagement with said screw, and a second head rotatably mounted on the first-named head and having a channel opening out against the face of the first-named head, and means for clamping the shank of the knife in said channel with the rear edge of the shank in contact with the front face of the first-named head, substantially as and for the purpose described.

15. In a machine of the class described and in combination, a frame comprising a base, and side bars or standards, cross bars extending between said standards, one of the same being adjustable toward and from the other, a shoe or plate loosely mounted between said cross bars and having a face designed to coöperate with the inner face of one of the standards, a spring coacting with one face of the plate for forcing the same toward said standard, a knife, and a carrier therefor, substantially as and for the purpose specified.

16. In a machine of the class described and in combination, a frame comprising a base, and side bars or standards, cross bars extending between said standards, one of the same being adjustable toward and from the other, a shoe or plate loosely mounted between said cross bars and having a face designed to coöperate with the inner face of one of the standards, a spring coacting with the opposite face of the plate, said spring comprising a flat plate, adjustable means for supporting the rear end of said spring and adjustable means coacting with the intermediate portion of the spring for varying the tension thereof, substantially as and for the purpose set forth.

17. In a machine of the class described and in combination, a frame comprising a base, and side bars or standards, cross bars extending between said standards, one of the same being adjustable toward and from the other, a shoe or plate loosely mounted between said cross bars and having a face designed to coöperate with the inner face of one of the standards and provided with lugs coöperating with the cross bars to prevent said plate being withdrawn from between said bars, substantially as and for the purpose described.

In testimony whereof, I have hereunto signed my name in the presence of two attesting witnesses, at Palmyra, in the county of Wayne, in the State of New York, this 13th day of June, 1910.

OSCAR W. TRUMBULL.

Witnesses:
J. D. LOVELAND,
DAVID M. USSHER.

Copies of this patent may be obtained for five cents each, by addressing the "Commissioner of Patents, Washington, D. C."